United States Patent [19]
Snethen

[11] Patent Number: 5,368,779
[45] Date of Patent: Nov. 29, 1994

[54] DETERGENT WITH CLEANING AND WASTE WATER TREATING CAPABILITIES CONTAINING POLYACRYLATE AND DIMETHYLTHIOCARBAMATE

[75] Inventor: Thomas H. Snethen, Oregon City, Oreg.

[73] Assignee: Little Chemical Company, Portland, Oreg.

[21] Appl. No.: 997,699

[22] Filed: Dec. 28, 1992

[51] Int. Cl.$^5$ .................. C02F 5/10; B01D 21/01; C11D 3/37; C11D 7/34

[52] U.S. Cl. ............... 252/545; 252/173; 252/174.24; 252/180; 252/548; 252/DIG. 2; 252/DIG. 11; 252/DIG. 14; 210/729; 210/733

[58] Field of Search ............... 252/106, 153, 173, 170, 252/171, 174.24, 180, 545, 548; 210/729, 733

[56] References Cited

U.S. PATENT DOCUMENTS

| | | | |
|---|---|---|---|
| 3,882,038 | 5/1975 | Clayton | 252/164 |
| 3,893,936 | 7/1975 | Hubele | 252/106 |
| 3,929,561 | 12/1975 | Shema | 252/106 |
| 4,072,622 | 2/1978 | Kuhling | 252/179 |
| 4,606,842 | 8/1986 | Keyes | 252/174.23 |
| 4,687,592 | 8/1987 | Collins | 252/99 |
| 4,689,167 | 8/1987 | Collins | 252/95 |
| 4,836,948 | 6/1989 | Corring | 252/99 |
| 4,889,653 | 12/1989 | Ahmed | 252/99 |
| 4,933,101 | 6/1990 | Cilley | 252/99 |
| 4,935,065 | 6/1990 | Bull | 252/174.24 |
| 5,004,557 | 4/1991 | Nagarajan | 252/174.24 |
| 5,006,274 | 4/1991 | Durkam | 252/180 |
| 5,164,095 | 11/1992 | Sparapany | 252/180 |

*Primary Examiner*—Dennis Albrecht

[57] ABSTRACT

A detergent and formulations thereof for cleaning equipment and processing materials of oil, dirt, heavy metals, road film, and the like and separating of such materials from waste water comprises a mixture of sodium polyacrylate, monoethanolamine, potassium dimethyldithiocarbamate, surfactants and dipropylene glycol methyl ether in deionized water. The detergent acts as a water softener and flocculates dirt, heavy metals and sludge.

3 Claims, No Drawings

DETERGENT WITH CLEANING AND WASTE WATER TREATING CAPABILITIES CONTAINING POLYACRYLATE AND DIMETHYLTHIOCARBAMATE

BACKGROUND OF THE INVENTION

1. Field of the Invention.

This invention pertains to the use of cleanser or detergent formulations and solutions as waste water and water recycling treating solutions for reducing solids, heavy metals and oils in waste water. The invention particularly relates to a detergent formulation the, when properly used, cleans equipment and materials while simultaneously cleaning waste waters before discharge and increasing the efficiency of water recycling systems.

2. Description of the Prior Art.

Increasing restrictions on waste water effluents are forcing producers of such effluents to find ways either to recycle or clean such waters. These restrictions affect not only food processing and industrial plants, but also the cleaning of equipment within such plants. Particularly, the amount of effluent wash water produced during the clean up of equipment such as trucks which require the use of cleaning compounds for proper cleaning are restricted. Manufacturing processes which use water are limited to recycled effluent waters used in such processing.

In the past, processing and wash waters were dumped directly into the sewers or storm drains. Increasing concentrations of pollutants are being found in ground and fresh water systems. Some of these pollutants can be traced to processing plants and equipment clean up.

In order to limit such pollutants, industries have initiated plans for recycling and cleaning waste water effluents. Clean up of processing waste water mainly consists of filtration, flocculation and neutralization. These programs have met with limited success.

Neutralization of waste water is perhaps the most successful form of water discharge. However, neutralization is limited to balancing the pH of waste water for discharge and doesn't eliminate pollutants. Filtration can eliminate undissolved particles but will not remove pollutants which are dissolved in the water. Flocculation will eliminate some, but not all, pollutants, and requires space and time. Also, many flocculants are equally or more hazardous to the environment as the eliminated pollutants.

Recycled waste water is becoming more attractive to industry. Subsequently, waste water recycling equipment is increasingly important, particularly in the reuse of washing and processing equipment. However, water used for processing and equipment wash-downs needs to be treated. Industry generally uses soaps or detergents to wash equipment. The waste water from such processes and washes then is treated both mechanically and chemically through recycling equipment.

Theoretically, such waste water goes through a recycler. Chemicals and mechanical action cause the dirt and undissolved particles to deposit as a sludge and to float oils to be skimmed. The subsequent water should be clean enough to be reused in the same process or to be discharged into the environment. Sludge and oils are removed periodically from the water recycling equipment. In a non-recycling scheme, the chemically and mechanically treated water should be clean enough for discharge.

However, water used with soap or detergent alone, does not clean or recycle well. Most detergents and soaps use a caustic soda base for cleaning which ties up oils and heavy metals. Detergent and soap formulations emulsify oil and suspend it so well that it is difficult to separate the waste components from the water to be recycled or discharged. This can result in the physical blockage of any mechanical actions that would have aided in waste water clean up. Additionally, such soaps and detergents increase the microbial growth in the waste water or waste water recycling equipment, causing blockage of baffles and filters and creating odor emissions. Microbial growth is a major factor in the failure of waste water recycling units. Most soaps, detergents and cleaners contribute to microbial growth in waste water treating systems.

Recycled or discharged Industrial cleaners are made of the following basic components:

| Cleaner component | Purpose |
| --- | --- |
| Sodium Hydroxide | Cleaning agent |
| Sodium Metasilicate Pentahydrate | Alkalinity builder and cleaning agent |
| Glycol Ether | Oil emulsifier |
| Phosphates | Water softener |
| EDTA and/or NTA | Water softener |
| Carboxymethylcellulose | Clinging and thickening agent |
| Surfactants | Surface tension reduction and penetrating agent |
| Hydrotrope Phosphate Ester | Formula stratification inhibitor |

These components, however, present special problems in water recycling equipment. Sodium hydroxide increases the pH of the water and emulsifies the oils so well that the oils will not separate from the water in the recycling equipment. Sodium hydroxide also contributes to scaling (calcium build-up) of equipment and water spots upon drying.

Sodium metasilicate pentahydrate builds alkalinity, which acts as a buffer, and contains sodium hydroxide, which increases oil emulsification. A glycol ether further causes oil emulsification making oil separation more difficult.

To counteract the negative effect of such cleaners on waste water treating systems, users must treat the waste water with some or all of the following types of chemicals: polymers, pH adjusting chemicals and bleach.

Cationic and anionic polymers are charged such that dissolved and undissolved particles precipitate or "floc" out of the water. Such precipitation of "dirt" collects as a sludge for later removal. However, polymers can cause microbial growth and leave a hazardous residue in the "cleaned" water. Finally, a polymer's efficiency can be limited, depending on the content of the waste water.

PH adjusting chemicals, such as caustic soda, aid in the precipitation of heavy metals such as lead, cadmium, chrome, and nickel. Yet, heavy metals precipitate over a narrow specific pH range for each specific metal thereby requiring constant pH adjustment. Typical pH adjusting chemicals also tie up oils, making oil-water separation more difficult.

EDTA is also used for heavy metal collection. However, harmful residues may emerge from the waste water treatment equipment and be found in the discharge water.

Bleach is often used as a last resort to kill unwanted microbial growth in waste water treating systems. This method is inefficient and causes chlorine residues in the recycled or discharged water.

SUMMARY OF THE INVENTION

The present invention provides a detergent and formulations derived therefrom that can clean equipment and processed materials of oil, dirt, heavy metals, road film, and the like and at the same time allow for the separation of such materials from water. Additionally, the present invention provides a detergent and formulations derived therefrom that inhibit microbial growth in waste water treating systems and while having little impact on waste water pH and increasing the efficiency of waste water recycling systems.

A detergent formulation according to the present invention for cleaning surfaces of a boiler, cooling tower or the like and at the same time treating waste water comprises a mixture of about 0.15% to 20% sodium polyacrylate in deionized water for acting as a water softener and flocculating dirt and sludge.

The detergent formulation according to the present invention may further include monoethanolamine in the range of about 1.7% to 2.3% for acting as a cleaning agent without emulsification of oils and films.

The detergent formulation according to the present invention may further include potassium dimethyldithiocarbamate in the range of 0.15% to 11% and may also further include dipropylene glycol methyl ether in the range of about 2.8% to 3.3%.

A process according to the present invention for producing a detergent formulation that cleans and softens waste water, flocculates dirt, sludge and heavy metals without containing phosphates and without emulsifying oils or promoting microbial growth, comprises the steps of adding about 222 gallons of deionized water to a container, adding between about 150 pounds and about 190 pounds of monoethanolamine to the container, adding between about 3 pounds and about 1689 pounds of potassium dimethyldithiocarbamate to the container, adding between about 35 pounds and about 4223 pounds of sodium polyacrylate, adding between about 240 pounds to about 270 pounds of dipropylene glycol methyl ether, adding between about 21 pounds and about 84 pounds of a non-ionic surfactant, adding between about 17 pounds and about 156 pounds of alkali surfactant (isodecyloxypropyliminodipropionic acid monosodium salt); and adding deionized water to balance mixture to 1000 gallons total volume.

DESCRIPTION OF THE PREFERRED EMBODIMENT

The present invention provides a formulation and use for a detergent and formulations thereof that can clean materials and equipment and at the same time treat or aid in the treatment of waste waters. The detergent centers around a resin, specifically, an acrylic resin, and more specifically, sodium polyacrylate and derivatives thereof. Additionally, the invention does not use sodium hydroxide, which is an ingredient in most detergents. Sodium polyacrylate is a resin polymer designed and used as a dispersant and anti-corrosion compound. Sodium polyacrylate is a derivative of acrylic acid which has its double bond broken at the one and two carbons to form repeating units of the same. The hydrogen on the hydroxyl group of the acid is replaced by sodium. Sodium polyacrylate is used in cooling towers and boilers to inhibit calcium build-up on internal surfaces.

The invention provides a detergent and use of the detergent and formulations thereof that functions both as an industrial cleaning agent and an aid in the treatment of waste waters. Therefore, instead of requiring two systems, namely a processing system or cleaning system and a system for treating the cleaning water, the present invention provides a single system that performs the functions of the two systems. At the same time the invention does not encourage the growth of microbials.

Formulations of the detergent and derivatives thereof cleans surfaces and treat waste water such that the discharge water from the water system is either reusable or dischargeable. Such formulations consist of a dispersant, cleaners, a heavy metal chelater, surfactants, a hydrotrope and an emulsifier.

The cleaning phase is accomplished by a blend of surfactants, cleansers and an emulsifier. This removes dirt, emulsifies oils and penetrates films. The dirt, oil and films are placed into solution to be carded away by the water used in the cleaning process.

The water treatment phase is accomplished by a blend of a dispersant, a heavy metal chelater, and an anticorrosive.

A formulation for both phases has no compounds which encourages microbial growth. A formulation for the cleansing and treatment of equipment and waste water according to the present invention is:

| Deionized water | 91.25% |
|---|---|
| Monoethanolamine | 2.00% |
| Potassium dimethyldithiocarbamate | 0.20% |
| Or sodium dimethyldithiocarbamate | |
| Sodium polyacrylate | 2.50% |
| Dipropylene glycol methyl ether | 3.00% |
| or other glycol ethers | |
| First Nonionic surfactant | 0.50% |
| Second Nonionic surfactant | 0.50% |

Sodium polyacrylate, which is a dispersant that acts as a descaler and water softener which prevents the deposition of calcium salts upon surfaces. Furthermore, sodium polyacrylate disrupts calcium crystal formations on surfaces, thus acting as a descaler. Finally, sodium polyacrylate acts as a water softener, thus increasing the detergency of the formulation and eliminating the need for phosphates, EDTA and/or NTA.

Monoethanolamine replaces sodium hydroxide as a cleaning agent in order to avoid the emulsification oils and films in the treatment phase.

There are two nonionic surfactants that aid in the penetration and cleaning of surfaces. One surfactant emulsifies oil in water and another emulsifies water into oil. Thus oil and film are removed from the surface and carried away allowing the emulsification to be broken readily during the water treatment phase.

During phase two, the water treatment phase, sodium polyacrylate wraps around undissolved particles which become too heavy to stay in the water phase, and thus drop out into sludge.

Potassium dimethyldithiocarbamate replaces caustic soda as a heavy metal flocculant and is preferable because it does not interfere with oil water separation. pH adjustments to remove heavy metals are essentially eliminated.

An embodiment of this invention is to dilute the above formulation or derivatives thereof, at a ratio up to 200:1 in water. The material is passed through a pressure washer having a pressure of 500 psi to 5000 psi under cold or hot conditions. The combination of components according to the present invention removes films, oils, dirt, sludge and heavy metals from cleaning or processing equipment. The removed material is then carried with the waste water and the components of the invention to a water treating system or water recycling system. During the water treatment phase, the combination of components according to the present invention aids in the removal of dirt, sludge, films, oils and heavy metals from water, thus allowing reuse or safe disposal of such water.

Another embodiment of the invention is to dilute the material at a ratio of up to 200:1 in water. The diluted material may be used to clean surfaces without pressure. The components of the invention removes films, oils, dirt, sludge and heavy metals from cleaning or processing equipment. The removed material is then be carried with the waste water and the components of the invention to a water treating system or water recycling system. During the water treatment phase, the components aid in the removal of dirt, sludge, films, oils and heavy metals from the water, thus allowing the reuse or safe disposal of such water.

Another embodiment is to dilute the material at a ratio of up to 200:1 in water or in a waste water stream. The material will treat the first stages of a water treating system or "pit" by separating oil, film, sludge and heavy metal within the pit.

A detergent formulation according to the present invention may be formed by the following steps:

1. Add 222 gallons of deionized water to a suitable container;
2. Add from 150 pounds to 190 pounds (1.797% to 2.277%) of monoethanolamine;
3. Stir mixture;
4. Add from 3 pounds to 1689 pounds (0.3060 % to 20.24%) of Potassium diimethyldithiocarbamate;
5. Stir mixture;
6. Add from 35 pounds to 4223 pounds (0.429% to 50.61%) of Sodium polyacrylate;
7. Stir mixture;
8. Add while stirring from 240 pounds to 270 pounds (2.876% to 3.235%) of dipropylene glycol monomethyl ether;
9. Add from 21 pounds to 84 pounds (0.252% to 1.006%) of non-ionic surfactant;
10. Stir mixture;
11. Add from 21 pounds to 84 pounds (0.252% to 1.006%) of non-ionic surfactant;
12. Stir mixture;
13. Add from 17 pounds to 156 pounds or 0.204% to 1.869% of alkali surfactant (isodecyloxypropyliminodipropionic acid monosodium salt);
14. Stir mixture;
15. Add deionized water to balance mixture to 1000 gallons;
16. Add 3600 ml of 3% alizarin green dye;
17. Stir mixture; and
18. Package in appropriate containers A preferred embodiment of the detergent formulation according to the present invention may be formed by the following steps:

1. Add 222 gallons of deionized water to a suitable container;
2. Add 168.75 pounds (2.022%) of monoethanolamine;
3. Stir mixture;
4. Add 16.92 pounds (0.203%) of Potassium diimethyldithiocarbamate;
5. Stir mixture;
6. Add 210.42 pounds (2.521%) of Sodium polyacrylate 40%;
7. Stir mixture;
8. Add while stirring from 254.16 pounds (3.045%) of dipropylene glycol monomethyl ether;
9. Add 42 pounds (0.503%) of non-ionic surfactant;
10. Stir mixture;
11. Add 42 pounds (0.503%) of non-ionic surfactant;
12. Stir mixture;
13. Add from 62.5 pounds (0.749%) of alkali surfactant (isodecyloxypropyliminodipropionic acid monosodium salt);
14. Stir mixture;
15. Add deionized water to balance mixture to 1000 gallons;
16. Add 3600 ml of 3% alizarin green dye;
17. Stir mixture; and
18. Package in appropriate containers Thus, the invention provides a one step process that provides significant advantages over the two step process that is commonly used by combining two previous treatment systems into one treatment. Without further elaboration, it is believed that one skilled in the art can, using the previous description, utilize the invention to the fullest extent.

The processes and methods disclosed herein illustrate the principles of the present invention. The invention may be embodied in other specific forms without departing from its spirit or essential characteristics. The described embodiments are to be considered in all respects as exemplary and illustrative rather than restrictive or limiting of the scope of the invention. Therefore, the appended claims rather than the foregoing description define the scope of the invention. All modifications to the embodiments described herein that come within the meaning and range of equivalence of the claims are embraced within the scope of the invention.

What is claimed is:

1. A detergent formulation for cleaning surfaces of processing equipment, moving equipment, parts, floors or the like and at the same time treating waste water, comprising a mixture of about 2.5% sodium polyacrylate in deionized water for acting as a water softener and flocculating dirt and sludge and aiding in gravimetric separation of oil from water, about 2.0% monoethanolamine and about 2.0% potassium dimethyldithiocarbamate.

2. The detergent formulation of claim 1 containing dipropylene glycol methyl ether in the range of about 2.0% to 3.0%.

3. A process for producing a detergent formulation that cleans and softens waste water, flocculates dirt, sludge and heavy metals without emulsifying oils or promoting microbial growth, comprising the steps of:

(a). adding about 222 gallons of deionized water to a container;

(b) adding between about 150 pounds and about 190 pounds of monoethanolamine to the container;

(c) adding between about 3 pounds and about 1689 pounds of potassium diimethyldithiocarbamate to the container;

(d) adding between about 35 pounds and about 4223 pounds of sodium polyacrylate;

(e) adding between about 240 pounds to about 270 pounds of dipropylene glycol monomethyl ether;

(f) adding between about 21 pounds and about 84 pounds of a non-ionic surfactant;

(g) adding between about 17 pounds and about 156 pounds of a hydrotrope; and (h) adding deionized water to bring the mixture to 1000 gallons total volume.

* * * * *